United States Patent [19]

Lagsdin

[11] Patent Number: 5,547,220
[45] Date of Patent: Aug. 20, 1996

[54] STABILIZER PAD FOR VEHICLES

[76] Inventor: Andry Lagsdin, 54 King Hill Rd., Hanover, Mass. 02339

[21] Appl. No.: 398,866

[22] Filed: Mar. 6, 1995

Related U.S. Application Data

[63] Continuation-in-part of Ser. No. 283,247, Jul. 29, 1994, Pat. No. 5,466,004.

[51] Int. Cl.$^6$ ........................................................ B60S 9/02
[52] U.S. Cl. ................................. 280/763.1; 280/764.1; 212/301
[58] Field of Search ............................. 280/764.1, 763.1; 212/189; 305/51, 54, 55; 292/183, 238

[56] References Cited

U.S. PATENT DOCUMENTS

| | | | |
|---|---|---|---|
| 2,277,939 | 3/1942 | Thalhammer | 248/193 |
| 3,219,362 | 6/1964 | Epstein | 280/150.5 |
| 3,244,301 | 4/1966 | Vaughan | 124/138 |
| 3,495,727 | 2/1970 | Long | 214/138 |
| 3,642,242 | 2/1972 | Danekas | 248/354 R |
| 3,721,458 | 3/1973 | Mitchell | 280/150.5 |
| 3,897,079 | 7/1975 | MacKenzie et al. | 280/150.5 |
| 3,913,942 | 10/1975 | MacKenzie et al. | 280/150.5 |
| 3,930,668 | 1/1976 | Schuermann et al. | 280/150.5 |
| 4,023,828 | 5/1977 | MacKenzie et al. | 280/763 |
| 4,039,206 | 8/1977 | Nault | 280/763 |
| 4,546,996 | 10/1985 | Hanson | 280/764.1 |
| 4,761,021 | 8/1988 | Lagsdin | 280/764.1 |
| 4,889,362 | 12/1989 | Lagsdin | 280/763.1 |
| 5,050,904 | 9/1991 | Lagsdin | 280/764.1 |
| 5,051,057 | 9/1991 | Kremer | 414/685 |
| 5,054,812 | 10/1991 | Lagsdin | 280/764.1 |

FOREIGN PATENT DOCUMENTS

| | | |
|---|---|---|
| 492912 | 5/1953 | Canada . |
| 1029715 | 4/1978 | Canada . |
| 1036148 | 8/1978 | Canada . |

*Primary Examiner*—Josie Ballato
*Attorney, Agent, or Firm*—Wolf, Greenfield & Sacks, P.C.

[57] ABSTRACT

A reversible stabilizer pad for use with stabilizer arms of vehicles. The reversible stabilizer pad has a plate with first and second ground contact faces pivotally coupled to the stabilizer arm such that the plate can rotate about the arm to engage the ground surface with either ground contact face. A spring member is provided such that it provides a spring tension that resists rotation of the pad in at least a first direction to prevent the pad from rotating from one contact face to the other contact face due to the inertia of the pad as the stabilizer arm is moved. The spring member also indexes the rotational position of the pad with respect to the arm so that at least one of the contact faces evenly engages a ground surface as the arm is emplaced.

25 Claims, 9 Drawing Sheets

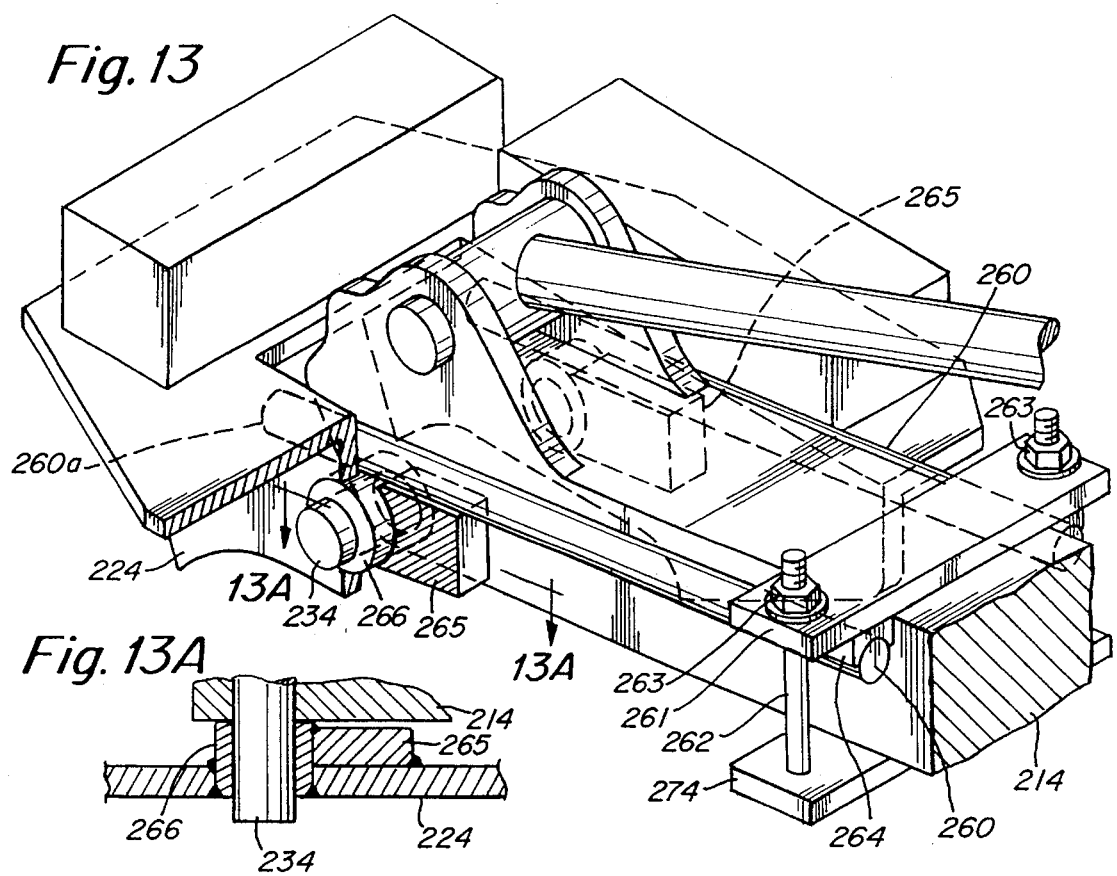
Fig. 13
Fig. 13A
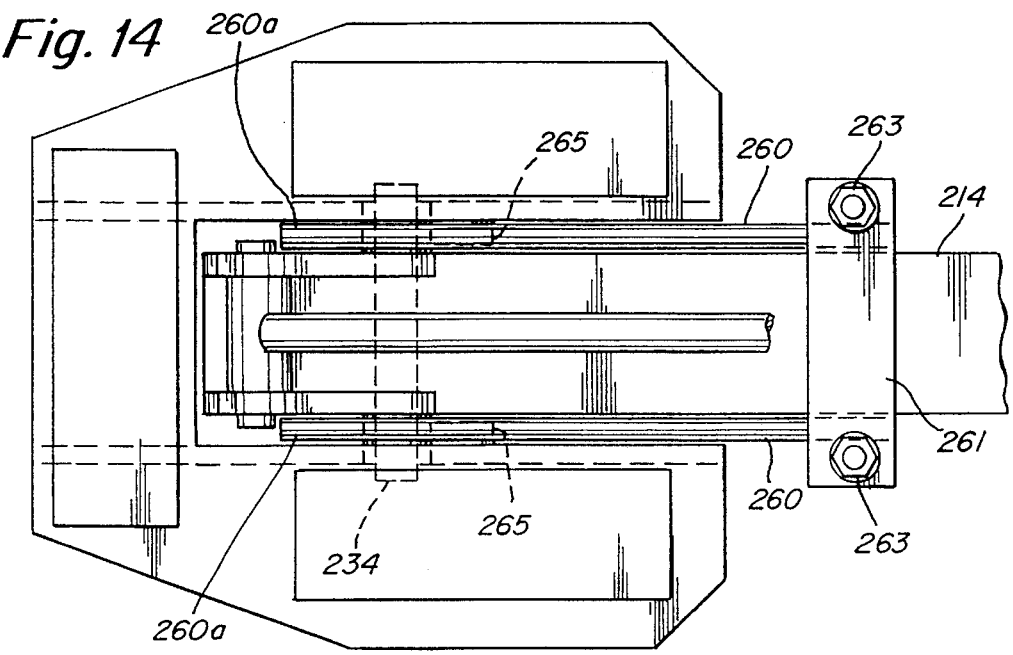
Fig. 14

STABILIZER PAD FOR VEHICLES

This application is a continuation-in-part of application Ser. No. 08/283247, filed on Jul. 29, 1994, now U.S. Pat. No. 5,466,004 issued Nov. 14, 1995.

FIELD OF THE INVENTION

The invention relates to stabilizer pads for vehicles. More particular, the invention pertains to an apparatus for preventing a pivotally mounted, two-way stabilizer pad from reversing its orientation under its own weight.

BACKGROUND OF THE INVENTION

U.S. Pat. No. 4,889,362 discloses a reversible stabilizer pad for earth moving vehicles having a generally flanged first surface for engagement with gravel and soft earth, for example, and a resilient surface for engagement with concrete or asphalt. This patent describes the use of rubber pads on one side of the stabilizer pad for ground contact when the vehicle is on a finished surface, such as concrete or asphalt, and flanges with grouser points on the opposite side of the stabilizer pad for ground contact when the machine is on an unfinished but hard ground surface that requires that the pads dig into the surface in order to better anchor and stabilize the machine when encountering difficult digging conditions. The flanged side of the pad is unsuitable for contact with the finished surfaces since it could damage and/or mar such surfaces. The stabilizer pad is pivotally mounted to the end of an hydraulically operated arm such that the pad may be rotated to contact the ground with either the rubber pad side or the flange side facing down to contact the ground surface.

When the vehicle is moved into position, if extra stability is needed, the stabilizer arms, on which the pads are mounted, are hydraulically operated to move from a retracted position, in which the arms generally extend upwardly and out of the way, to a use position, in which the arms extend downwardly at an angle with the pads contacting the ground surface. The arms and pads, of course, are positioned to provide extra stability to the vehicle. When the vehicle is to be moved, the arms are lifted back to the retracted position, the vehicle is moved to a new operating location and the stabilizer arms are brought down into the use position again, if necessary.

In prior stabilizer pad constructions such as the one described in U.S. Pat. No. 4,889,362, there has been a tendency for the pad to self-flip when the earth moving machine pad support arm is lifted. The self-flipping problem relates primarily to flipping from flanged side down to rubber pad side down because the rubber pad side is typically much heavier than the flange side. When the pad inadvertently flips sides, an operator must manually flip the pad back so that the proper side is facing down. Frequently, however, the operator does not realize that the pad has self-flipped or, even if he/she realizes it, does not bother to fix it. Accordingly, the machine is used with the wrong side of the stabilizer pad in contact with the ground surface, which could result in increased hazard as well as increased wear of the rubber pads, leading to premature need for replacement. The self-flipping of the pad can be remedied with a securing or engaging bolt that is required to be secured in each position of the pad and to be disassembled and re-secured when the position of the pad is to be changed. This becomes time consuming and furthermore may involve parts that are easily lost. Further, the operator simply may not use the securing pin or bolt.

U.S. Pat. No. 4,889,362 discloses an automatically operatable latch that is adapted to rotate into an engagement with the pad when the pad is in a ground engaging surface, and furthermore adapted to automatically rotate by gravitational force out of engagement with the pad when the arm of the earth moving machine that supports the pad is lifted. In this way, when the support arm is lifted, the latch disengages from the pad and the pad is easily rotated to its opposite position. It has been found, however, that rocks, gravel and other debris frequently get caught in the automatic latch disclosed in U.S. Pat. No. 4,889,362 which can prevent the latch from releasing when the arm is lifted. In many stabilizer constructions, however, the pad must rotate to some extent when the arm is lifted in order to allow the piston of the arm to retract into the cylinder. Failure of the latch to release can thus result in damage to the arm or pad.

In prior art stabilizer pad constructions, there is also a tendency for the pad, when configured with the rubber pad side down, to engage the ground surface with the rubber surface at an angle to the ground rather than horizontal to the ground as desired. As shown in FIG. 19, when the rubber pad engages the ground surface at an angle, it results in uneven wear of the rubber pad and causes the operator of the vehicle to be jolted as the pad engages the ground surface.

It is an object of the present invention to provide an improved stabilizer pad/arm construction for a vehicle.

It is a further object of the present invention to provide a stabilizer pad/arm construction for an earth moving machine which will not flip sides unintentionally.

It is another object of the present invention to provide a self-flip prevention mechanism which can be easily added to virtually any stabilizer pad/arm construction.

It is another object of the present invention to provide a stabilizer pad/arm construction for an earth moving machine which will not jam.

It is yet another object of the invention to provide a stabilizer pad/arm construction for a vehicle which will index the pad with respect to the arm to allow the pad to make smooth contact with the ground surface.

SUMMARY OF THE INVENTION

The invention is a stabilizer pad/arm construction for use with vehicles such as earth moving equipment or other construction vehicles. The stabilizer pad is coupled to the stabilizer arm so as to be pivotable about an axis of rotation. The stabilizer pad has a plate having first and second faces adapted to provide optimal contact patches with the ground, one side being particularly adapted for contacting soft earth or gravel and the other side particularly adapted for contacting asphalt, concrete or another hard surface. The stabilizer pad is rotatable about the pivot in order to be able to contact the ground with either side facing the ground.

In order to prevent the pad from accidentally rotating under its own weight so as to switch ground contact sides when the arm is lifted, the pad in one embodiment is coupled to the arm such that, in order for the pad to flip sides, the arm must pass through a channel defined by side walls of the pad. A steel plate is coupled transversely to the arm to define two small gaps between the side walls and the edges of the steel plate. A rubber strip, slightly longer than the steel plate and the channel, is sandwiched between the arm and the steel plate. When the pad is rotated to a predetermined position relative to the arm, the rubber strip contacts the side walls of the pad. The thickness of the pad is greater than the width of the gaps between the edge of the steel plate and the side walls. Accordingly, when the pad is rotated in a direction such that the pad enters the gap before the steel plate, the edges of the strip which extend beyond the edges of the plate bend upward and get trapped or jammed in the gap between the edge of the plate and the side wall. Since the strip is thicker than the gap, it is compressed and provides a high frictional resistance to further rotation of the pad relative to the arm in that direction. The frictional resistance is a function of the thickness of the pad relative to the thickness of the gap and the frictional coefficient of the surface of the pad and the side walls. The frictional resistance is selected such that the weight of the pad is insufficient to overcome the frictional resistance to further rotation, but small enough to allow the friction to be overcome with additional manual pressure when it is desired to flip the pad over.

Alternately or additionally, the strip may be resilient but relatively stiff so as to resist the bending necessary for the strip to fold inwardly on itself and fit through the gaps.

In another embodiment of the invention, at least one spring rod is connected to the support arm and an associated cam is connected to one side wall of the pad near the pivot point of the pad with the arm. A first end of the spring rod is firmly secured to the support arm, and a second end of the spring rod, located near the pivot point of the pad, is free to bend. During the rotation of the pad, the cam contacts the spring rod near the second end of the spring rod, and the spring rod must be forced to bend in order for the pad to flip sides. The spring rod is selected such that the inertia created by the weight of the pad is insufficient to overcome the spring force necessary to cause the spring rod to sufficiently bend to allow the cam and the pad to rotate. However, the spring force can be overcome with additional manual pressure when it is desired to flip the pad over. The cam and the spring rod are positioned such that the spring arm biases or indexes the cam to position the pad in a predetermined rotational position with respect to the stabilizer arm as the pad is lowered to the ground to allow the pad to evenly contact a flat surface.

BRIEF DESCRIPTION OF THE DRAWINGS

FIG. 13 is a sectional view with part of the pad removed showing another embodiment of the present invention with the stabilizer pad in a gravel or dirt engaging position.

FIG. 13A is a cross-sectional top view taken along line 13A of FIG. 13 showing the cam according to the embodiment of FIG. 13 of the invention.

FIG. 14 is a top plan view of the embodiment of FIG. 13 showing two spring rods and two cams.

DETAILED DESCRIPTION OF THE INVENTION

Figure 1:
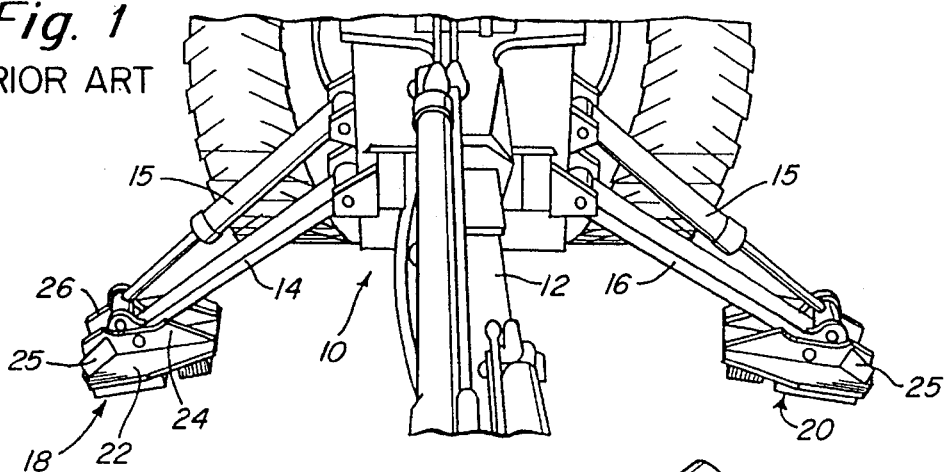
FIG. 1 is a fragmentary view of a typical loader/backhoe having stabilizer pads of the prior art secured thereto.

FIG. 1 is a fragmentary view of a typical loader/backhoe 10 having a shovel mechanism 12, stabilizer arms 14 and 16, and associated stabilizer pads 18 and 20, respectively. Hydraulic piston 15 may operate each of the stabilizer arms 14 and 16 independently. When the equipment is being moved, the pistons associated with each cylinder are withdrawn so that the support arms pivot and are thus elevated above ground level. As the arms are pivoted upwardly, it is in that position that the pads may then be reversed. When the support arms are to be used, the piston associated with each of the cylinders are extended to the position shown in FIG. 1 for ground engagement.

Figure 2:
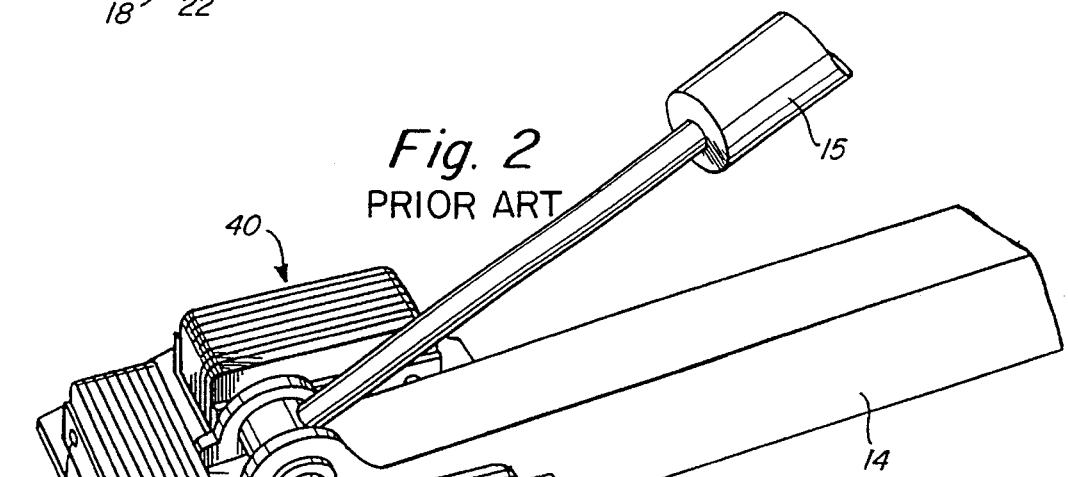
FIG. 2 is a perspective view of the stabilizer pad and arm of FIG. 1 in a gravel or dirt engaging position.
Figure 3:
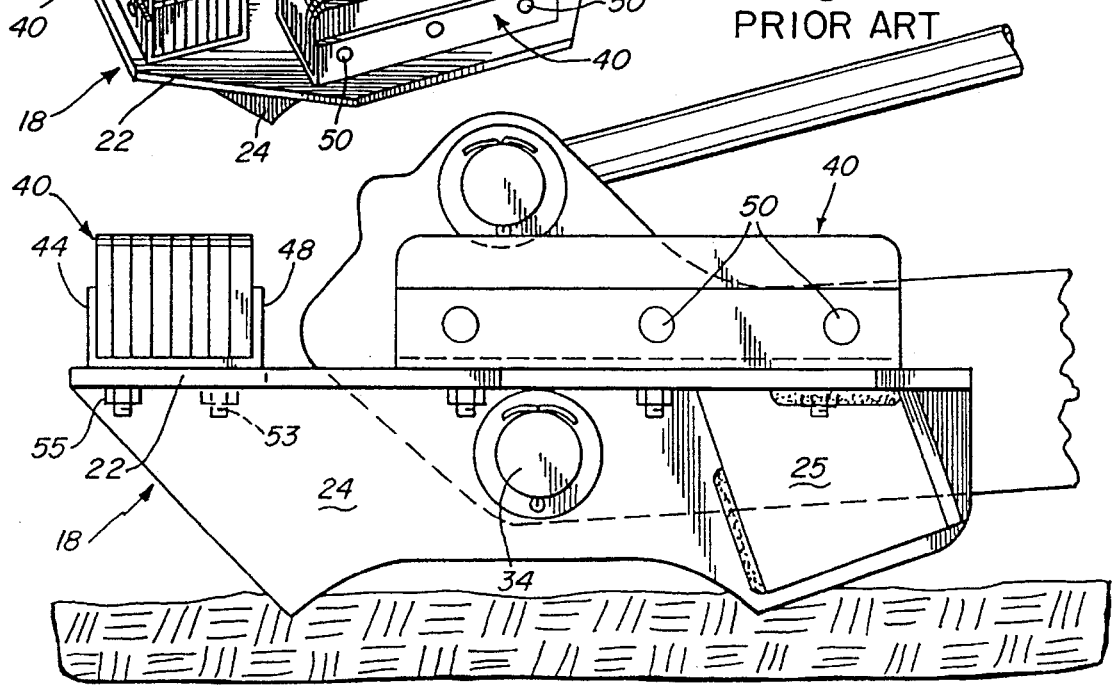
FIG. 3 is a side elevational view of the stabilizer pad and arm construction in the position of FIG. 2.
Figure 4:
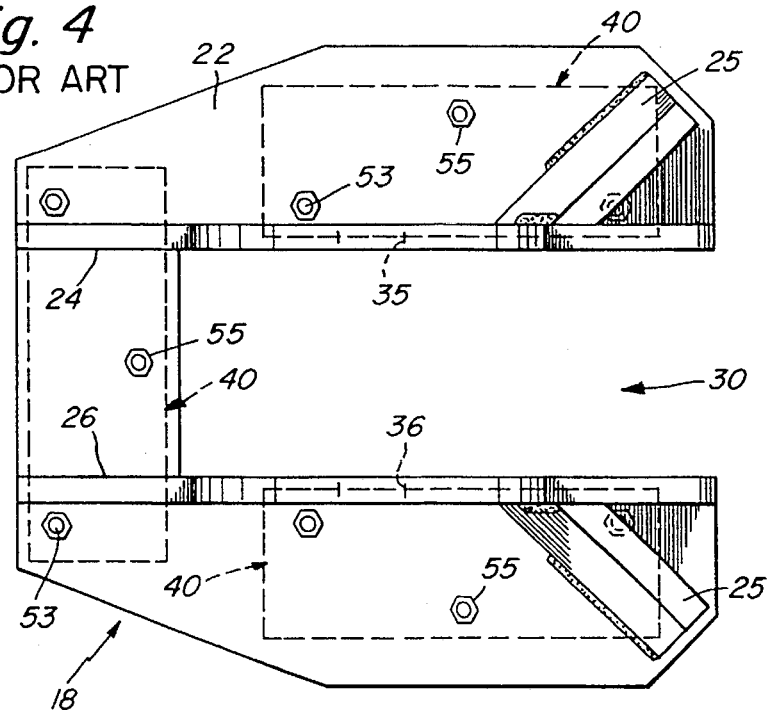
FIG. 4 is a bottom plan view of a stabilizer pad of FIGS. 1–3 shown uncoupled from a stabilizer arm.

With reference to FIGS. 2 and 3, the stabilizer pad 18 generally includes a flat plate 22 that has extending normal to the surface thereof the flanges 24 and 26, both extending on one side from the surface of plate 22. The stabilizer pad is also provided with supporting webs or ribs 25, one associated with each flange. These provide additional support for the flanges 24 and 26. The plate 22 is notched at 30 between flanges 24 and 26 such as illustrated in FIG. 4. The plate is notched so as to accommodate the arm 14 and to enable the reversible rotation of the stabilizer pad. The arm 14 includes a journal end for accommodating pin 34. Pin 34 also fits within holes 35 and 36 of flanges 24 and 26, respectively. The pin 34 may be secured in place by means of a typical cotter pin as illustrated in FIG. 3, or the pin 34 may be threaded to accommodate a nut. FIG. 2 most clearly illustrates the resilient side of the pad is in the form of three laminated pads 40.

The drawings illustrate the basic components comprising the stabilizer member resilient pad structure. This includes the angle irons 44 and 48. Both angle irons include a base leg and an upright leg. Each of the upright legs has holes therein for receiving the elongated securing pins 50. The laminated pads are secured to the plate 22 by means of a series of bolts 53 each having associated nuts 55.

Figure 5:
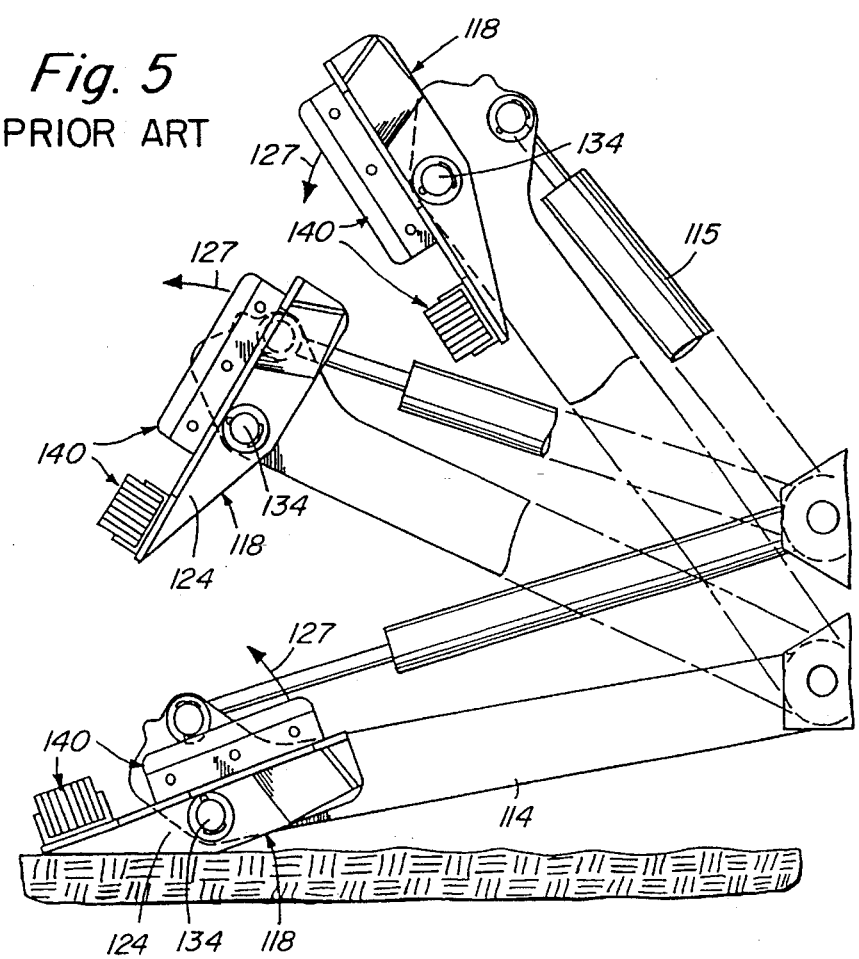
FIG. 5 is a sequential diagram illustrating the prior art problem of the stabilizer pad self-flipping.

FIG. 5 illustrates a sequence of events as a support arm 114 is lifted. In the bottom position, the pad 118 is illustrated with the flanges 124 in contact with the ground surface. In the top position is it noted that the pad has now self-flipped so that the resilient side of the pad with the laminated pads 140 is facing substantially downwardly. The support arm 114 may be lifted in a rather jerky motion. Because of certain inertia, the pad is apt to rotate about the pin 134 to flip on its own. This is undesirable because, typically at a construction or other site at which earth moving equipment is being used, the ground surface is relatively consistent, either being soft, so that one desires the laminated side to be facing down. At such a site, the earth moving equipment typically is moved many times, requiring stabilizer arms to be retracted upwardly so that the earth moving machine can be moved and the stabilizer arms to be put down again with the same side facing down. Only when the ground surface changes, a relatively rare occurrence, it is desired that the stabilizer pad flip over.

Although the pad does not tend to self-flip from the rubber side to the flanged side, because the rubber side of the pad is considerably heavier than the flanged side, the pad does tend to self-flip from the flanged side to the rubber pad side.

In the sequence of FIG. 5, which should be viewed from the bottom up, the pad 118 is shown engaging the ground surface at the bottom of the figure. As the arm 114 is raised by the hydraulic piston 115, there is an inertia force in the direction of arrow 127. This same inertia force is also illustrated in the middle position illustrated in FIG. 5 wherein the pad is illustrated as now having been half-flipped upon a raising of the support arm 114. The top position in FIG. 5 illustrates the pad now completely reversed. When the arm 114 is now lowered again, the wrong surface will be facing downward and will engage the ground since the pad has self-flipped.

The present invention provides a stabilizer pad/arm construction which eliminates the self-flipping problem. Further, virtually any other stabilizer pad/arm construction can be easily and inexpensively modified to the construction of the present invention to eliminate the problem of self-flipping.

Figure 6:
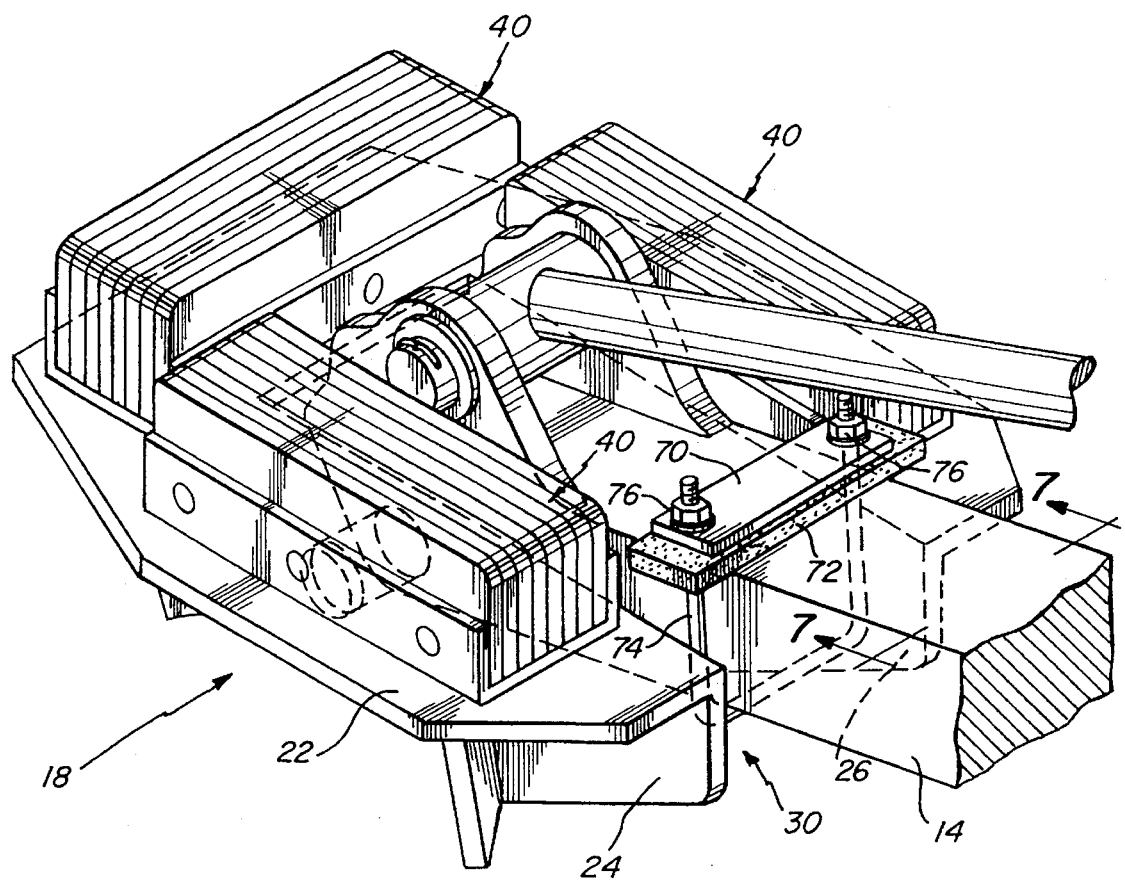
FIG. 6 is a fragmentary view of the stabilizer pad of the present invention coupled to a stabilizer arm.
Figure 7:
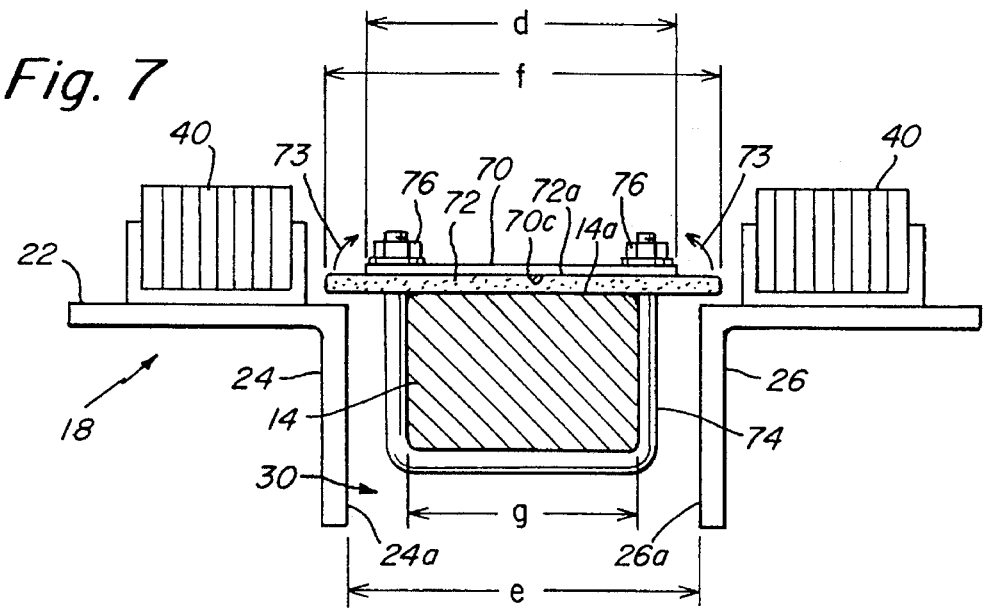
FIG. 7 is a schematic cross-sectional end view taken along line 7 of FIG. 6 showing the pad in a gravel contacting position.
Figure 8:
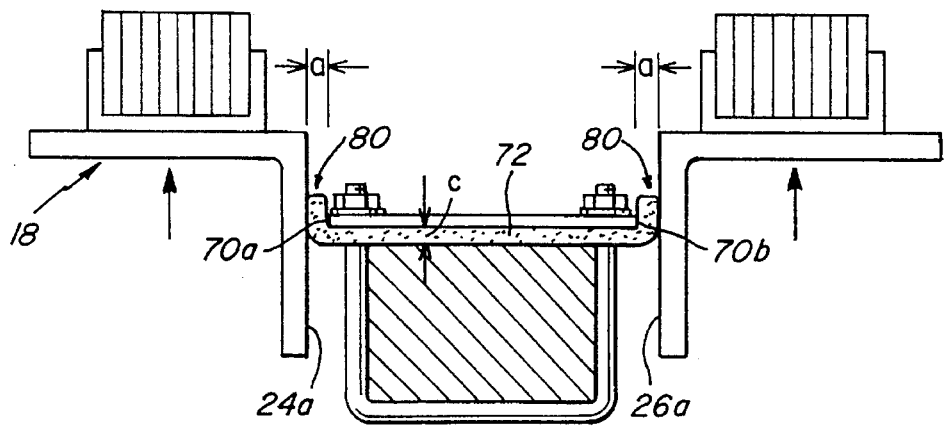
FIG. 8 is a schematic cross-sectional end view similar to FIG. 7 showing the arm and pad in a second relative rotational position.
Figure 9:
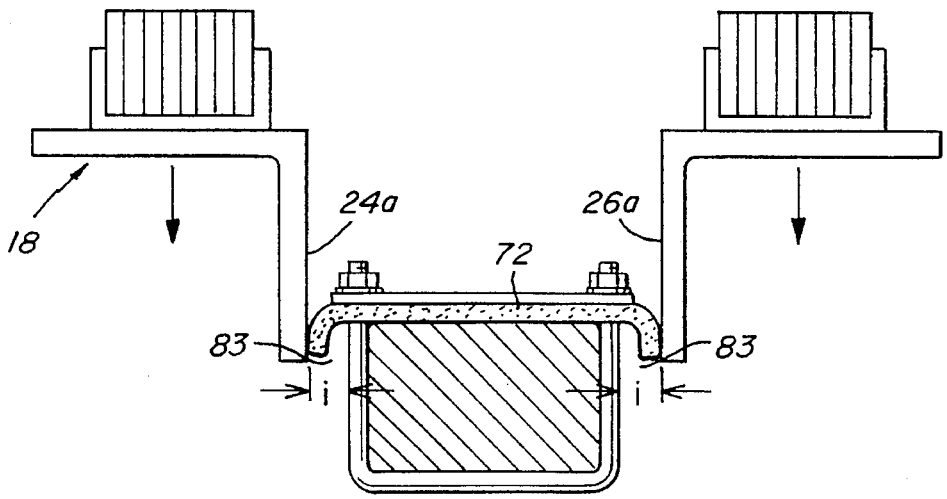
FIG. 9 is a schematic cross-sectional end view similar to FIG. 7 showing the arm and pad in a third relative rotational position.

A preferred embodiment of the invention will now be described in detail with reference to FIGS. 6–9. The pad 18 comprises a steel plate 22 which is adapted to contact the ground with either side of the plate facing downwards. In FIG. 6, the side having flanges 24 for contact with soft earth is facing downward and the side bearing rubber pads 40 is facing upwardly. The stabilizer arm 14 extends in channel 30 (best seen in FIGS. 7, 8 and 9) and is pivotally coupled to the pad 18 in the manner best illustrated by FIG. 3 and discussed above. A steel plate 70 and a high friction, resilient strip 72 are fixed to the arm by a partially threaded U bolt 74. As best seen in FIGS. 7–9, the U bolt 74 surrounds the arm 14 and engages holes through the plate 70. Threaded buts 76 engage the threaded ends of the U bolts to secure the plate to the U bolt around the arm. The strip 72 is sandwiched between upper surface 14a of the arm 14 and the lower surface 70c of the plate 70. The strip is formed of rubber or another flexible, abrasion resistant, material, such as spring tempered metal or neoprene. Preferably, the material also has a relatively high coefficient of friction, e.g., rubber or neoprene. The steel plate 70 is of a length, d, which is greater than the width, g, of the arm yet smaller than the width, e, of the channel 30. The rubber strip 72 is of a length, f, greater than the width, e, of the channel such that, when the arm is rotated into the channel the rubber strip 72 does not fir through the channel with the rubber strip 72 in its fully extended horizontal position, as best seen in FIG. 7. Since the length, d, of the plate 70 is less than the width, e, of the channel, small gaps 80 of width a (see FIG. 8) exist between the edges 70a and 70b of the steel plate 70 and the side walls 24a and 26a of the channel 30. The thickness, c, of the rubber strip 72 is greater than the width, a, of gaps 80. The strip 72 is preferably rubber such that it has a surface or relatively high friction, is compressible, in the direction of its thickness, c, and can be flexed under force in the direction of the arrows 73 in FIG. 7.

Figure 6A:
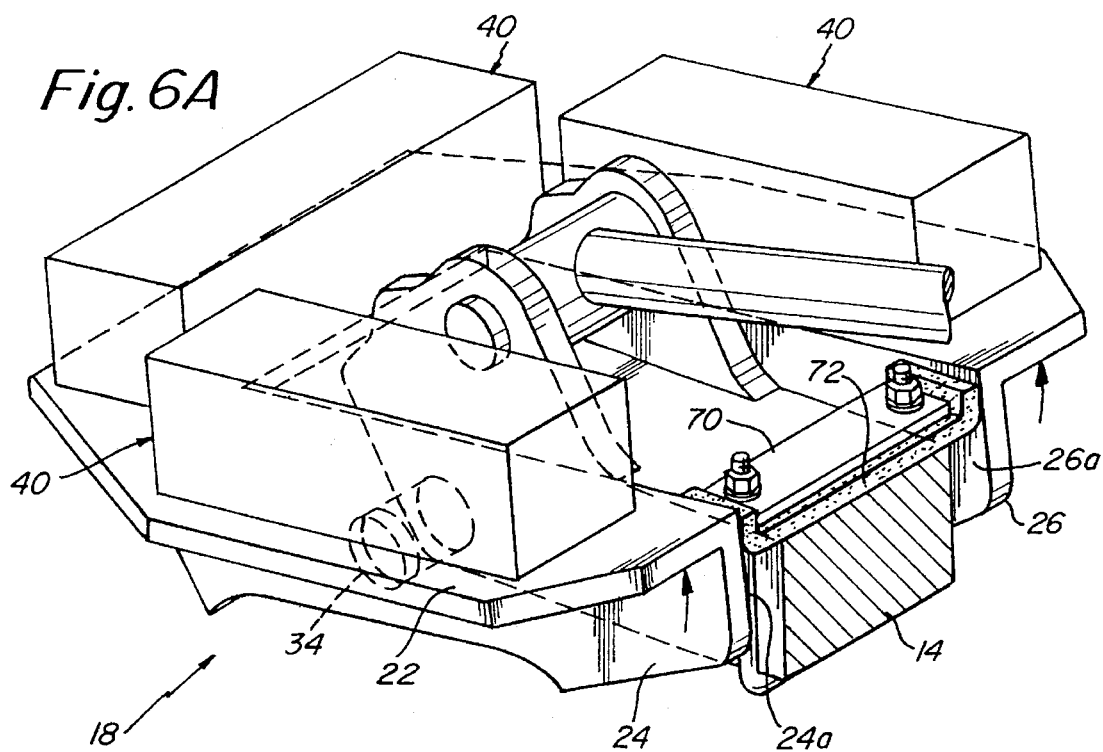
FIG. 6A is a fragmentary view similar to FIG. 6 showing the arm and pad in a second relative rotational position.

When the arm and pad are in the relative rotational relationship shown in FIGS. 6 & 7, the pad can be forced to rotate further into the position shown in FIGS. 6A & 8 (rotated counterclockwise in the view of FIG. 6) such that the end portions of the rubber strip 72 which extend beyond the edges 70a and 70b of the plate 70 flex upwardly and become trapped between the side walls 24a and 24b and the edges 70a and 70b of the plate 70, providing a frictional resistance to further rotation in that direction. The particular thickness, c, of the rubber pad 72 and/or its surface coefficient of friction is selected such that the inertia of the pad itself towards self-flipping cannot overcome the frictional resistance, but application of manual pressure to further rotate the pad in the counterclockwise direction can overcome the frictional resistance to rotation in that direction. Accordingly, someone wishing to flip the pad so that the rubber side faces down can do so easily, but the pad will not be able to self-flip accidentally under solely its own inertia.

Figure 6B:
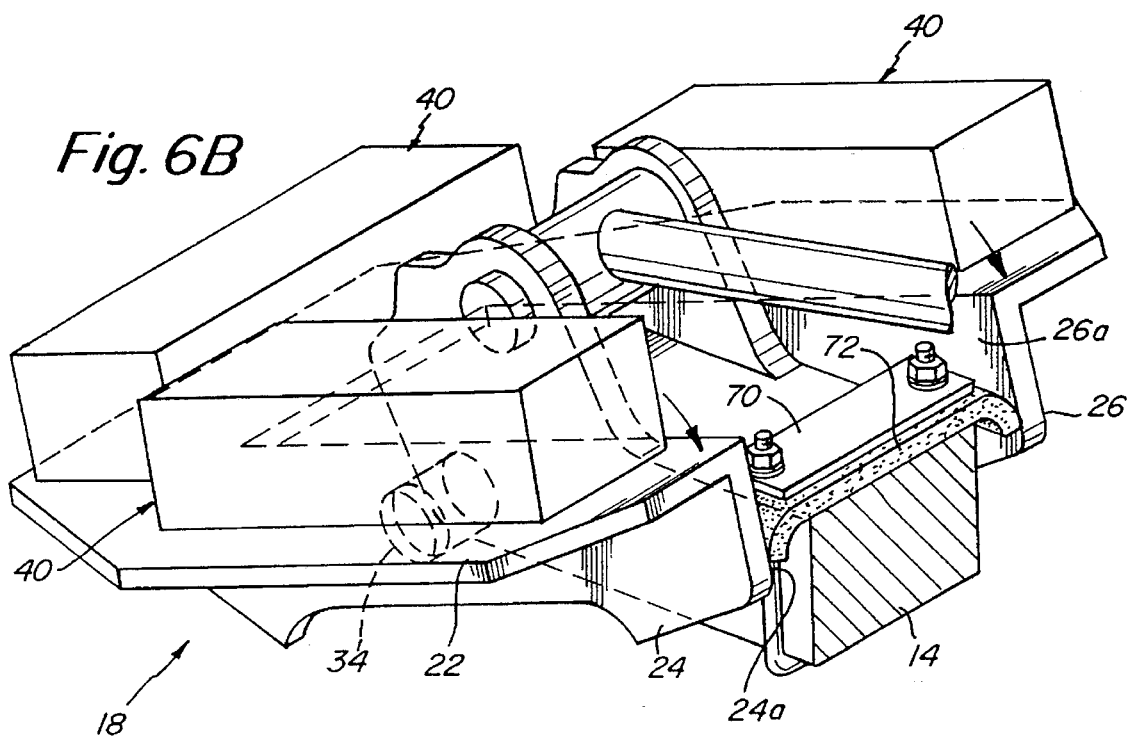
FIG. 6B is a fragmentary view similar to FIG. 6 showing the arm and pad in a third relative rotational position.

Typically, stabilizer pads are likely to self-rotate only from flange side down to rubber side down, and not vice versa, because the rubber side typically is much heavier than the flanged side. Accordingly, it is preferable that there is substantially less or even no resistance to rotation of the arm through the channel in the opposite direction (in the clockwise direction in the view shown in FIG. 6). Accordingly, the gap 83 between the edges of the U bolt and the side walls is of a width, i, (see FIGS. 6B & 9) greater than the thickness, c, of the pad 72. Accordingly, there is very little frictional resistance to rotation of the arm through the channel in that direction since the strip 72 is not compressed in the gap 83.

The flexibility of the strip 72, i.e., its resistance to flexing in the direction of arrows 73 in FIG. 7 should be low enough so as not to offer any significant resistance to rotation in a clockwise direction. It should be noted that the length of the strip which is allowed to flex when the arm passes through the channel in the clockwise direction in FIG. 6, i.e., f–h, is much greater than the length of the strip which is allowed to flex when the arm passes through the channel in the counterclockwise direction, i.e., f–e. Thus, more force is required to flex the shorter exposed strip 72 upward in FIGS. 7–9 to fit through the channel 30 than to flex the longer exposed ends vertically downwardly to fit through the channel because a greater length of the strip is allowed to flex when flexed downwardly. Accordingly, the resistance to rotation in the clockwise direction is much less than in the counterclockwise direction, not only because of the substantial lack of frictional resistance to clockwise rotation, but also because there is substantially less force required to flex the ends of the strip to fit through the channel 30 when rotating the pad clockwise. Thus, the resistance to rotation in both directions is a function of the coefficient of friction of the strip material, the thickness of the strip material, and the stiffness of the strip material. Any one or more of these properties of the strip material can be used to set the desired force necessary for rotation beyond the contact point in either direction. For instance, if desired, a low friction material can be employed and the resistance to rotation can be primarily a function of flexibility, with friction playing almost no part.

It has been found that rubber strips cut from side wall segments of truck-tire carcasses provide acceptable material in terms of flexibility properties and surface friction properties to serve as rubber strips 72.

Figure 10:
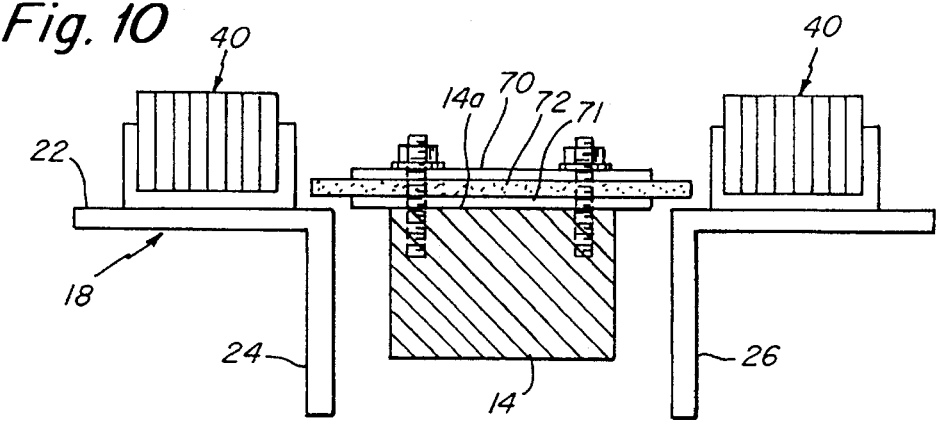
FIG. 10 is a schematic cross-sectional end view similar to FIG. 7 showing a first alternative embodiment of the present invention.

Of course, if in a particular stabilizer pad/arm combination, it is desirable to better prevent self-flipping in either direction, another steel plate 71 substantially of the same dimension as the top steel plate 70 can be placed between the top surface 14a of the arm 14 and the bottom surface of the rubber strip 72, as shown in FIG. 10, so as to offer the same resistance to rotation of the arm in the channel in both directions. Further the steel plate 70 need not be coupled to the arm by a U bolt surrounding the arm but may simply be bolted to the arm itself such as by providing at least two bolts passing through holes in the plate, the bolts being received in corresponding threaded holes in the arm. Alternately, the strip may be glued to the arm, eliminating the need for a steel plate.

Figure 11:
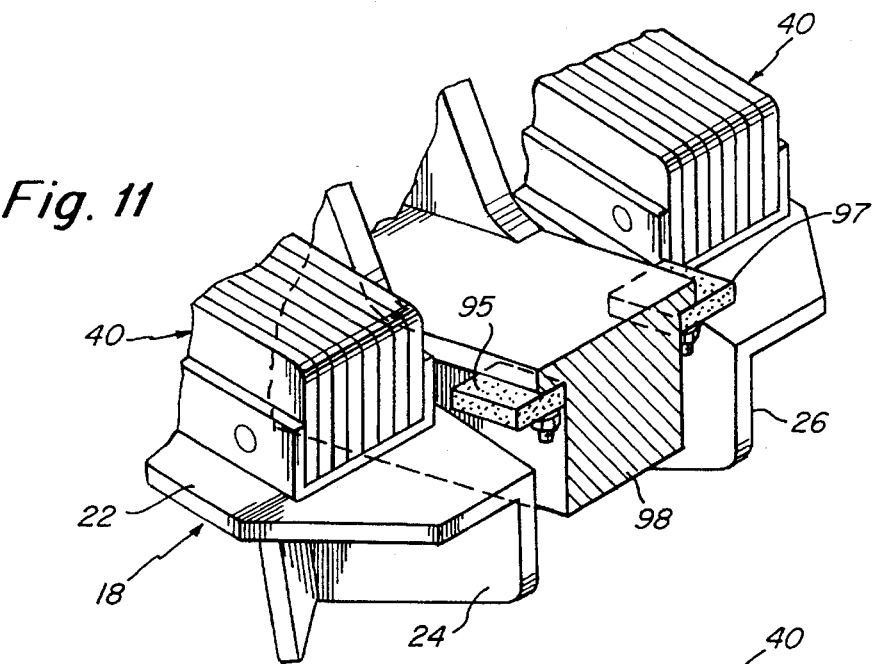
FIG. 11 is a cross-sectional end view similar to FIG. 7 showing a second alternative embodiment of the present invention.

Furthermore, FIG. 11 illustrates still another embodiment of the present invention in a partially cut away perspective view. In FIG. 11, the arm 98 is provided with a stepped cross section, as illustrated. This defines opposed flanges under which is provided two rubber strips 95 and 97. The rubber strips 95 and 97 are glued or otherwise attached to the arm 98. In FIG. 11, the strips 95 and 97 are illustrated being bolted to the opposite sides of the arm 98.

Figure 12:
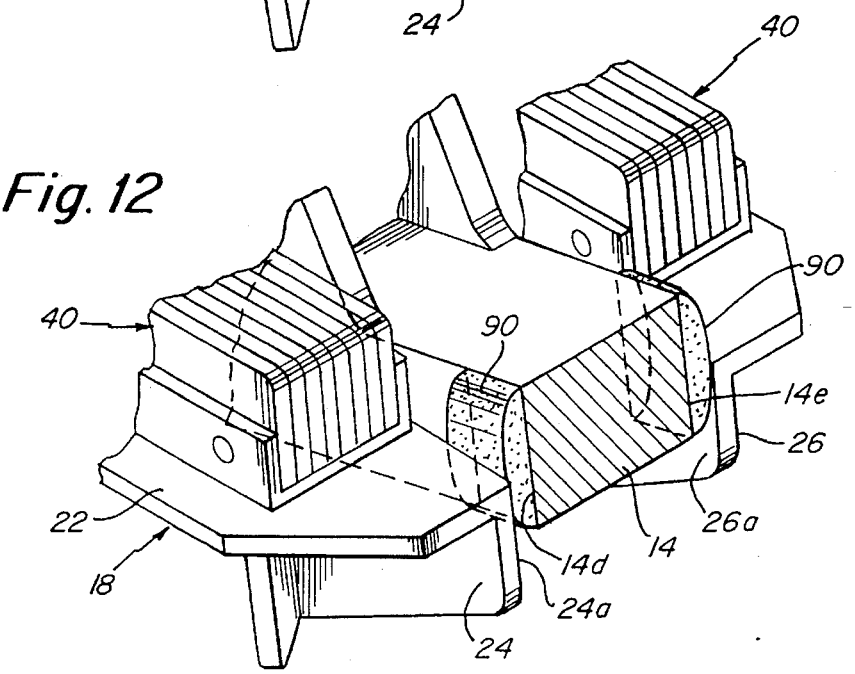
FIG. 12 is a cross-sectional end view similar to FIG. 7 showing a third alternative embodiment of the present invention.

Reference is now made to the cut away perspective view of FIG. 12 for an illustration of another embodiment of the present invention. In this particular embodiment, resistance to rotation is provided in both directions. For this purpose, there is provided a compressible frictional pad 90 that can be bolted, glued or otherwise fixed to the side surfaces 14d and 14e of the arm 14. This arrangement provides a high friction press fit between the individual pads 90 and the side walls 24a and 26a of the stabilizer pad 18.

FIGS. 13 and 14 illustrate a different arrangement for preventing self-flipping of the pad. This arrangement includes support structure comprised of an upper plate 261 and a lower plate 274. These plates are affixed to the stabilizer arm 214 using two threaded bolts 262 and associated threaded nuts 263. The upper plate has two channels 264 disposed on opposite side of the stabilizer arm 214. Each channel is adapted to receive an end of one of two spring rods 260. FIGS. 13 and 14 illustrate these spring rods 260 disposed on either side of the stabilizer arm 214 and extending longitudinally on either side thereof.

The spring rods 260 may be fixed to the channels using, for example, an adhesive. Alternatively, instead of channels, closed cylindrical passages, adapted to receive the ends of the spring rods, may be provided. Furthermore, bolts can be provided to secure each spring rod 260 in place at its respective side of the stabilizer arm 214.

The spring rods 260 are formed of a flexible material. For example, they can be constructed of a relatively stiff hard rubber material. Each of the spring arms extend along opposite sides of the stabilizer arm 214, as illustrated in FIGS. 13 and 14, and are fixed only at the ends supported at the channels 264. The opposite ends 260a are not fixed in place, but extend in a manner over the pin 234 and over a respective cam 265.

Two cams 265 are fixed to the flanges 224 and to the journal 266 as shown in FIG. 13A. This allows the cam to rotate along with the pad with respect to the stabilizer arm 214. In FIG. 13A, the cams are welded to the flanges and the journal, however, the cams could be held in place using bolts and nuts.

Figure 15:
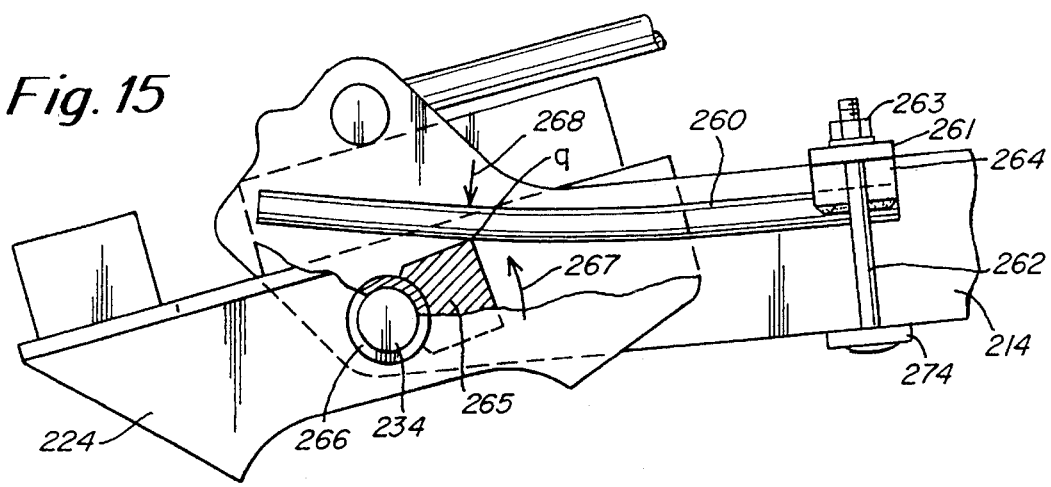
FIG. 15 is a side schematic view of the embodiment of FIG. 13 showing the pad attempting to flip over against the force of the spring arm.
Figure 16:
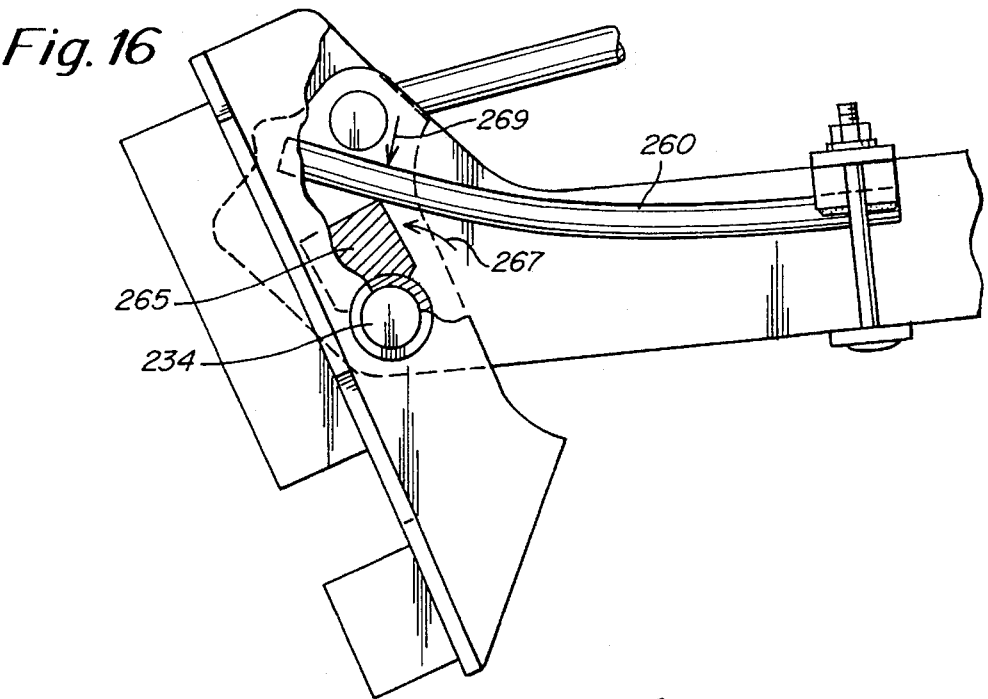
FIG. 16 is a side schematic view of the embodiment of FIG. 13 showing the pad being manually pivoted to the rubber side.

The operation of the embodiment of the invention shown in FIG. 13 will now be described with reference to FIGS. 15–18. FIG. 15 shows the stabilizer pad with the flange side down attempting to rotate to the rubber side as shown by arrow 267. The cam 265 is in contact with the spring rod, and as shown by arrow 268, the spring rod tension resists the rotational movement of the stabilizer pad. The material of the spring rods 260, as well as the diameter and the length of the spring rods, are selected such that the inertia of the pad itself towards self flipping cannot overcome the spring tension of the spring rods. In the described embodiment, two spring rods and two associated cams are provided to create the required spring tension. However, it should be realized that depending upon spring arm material selection and the rotational inertia created by the stabilizer pad, only one spring rod may be required.

As indicated previously, in connection with FIG. 15, the spring rods are used to prevent self-flipping of the pad. However, the materials and dimensions of the rod are also selected so as not to prevent a manual rotation of the pad. Thus, even though there is some force imparted by the spring rods, the force is of a magnitude such that it can be overcome by manual rotation (manual urging) of the pad. In connection with this, refer to FIG. 16 which shows the pad having been manually pivoted toward the rubber side. The direction of rotation is indicated by arrow 269.

Figure 17:
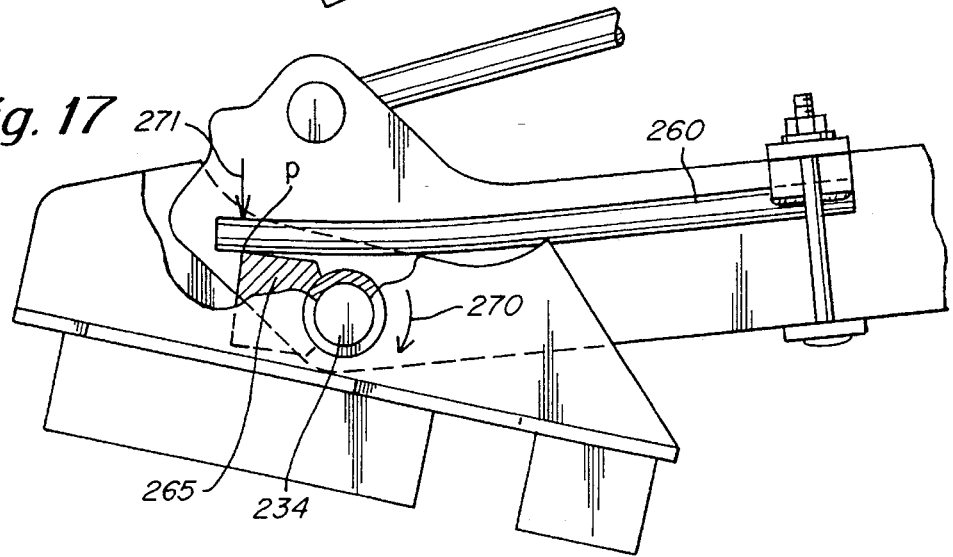
FIG. 17 is a side schematic view of the embodiment of FIG. 13 showing the spring arm indexing the cam to allow the rubber side to evenly contact a flat hard surface.

The present invention also resists self-flipping of the pad from the rubber side to the flange side. FIG. 17 shows the pad with the rubber side down rotating toward the flange side as shown by arrow 270. The cam 265 is in contact with the spring rod at point p, and as shown by arrow 271, the spring rod tension resists the rotational movement of the pad.

The self flipping problem of the stabilizer pad relates primarily to flipping from the flange side down to the rubber side down, because the rubber side is typically much heavier than the flange side. Therefore, a greater force is required to prevent the pad from flipping to the rubber side down position than to the flange side down position. The embodiment of the present invention shown in FIGS. 13-18 provides this greater force against rotation in the direction toward the rubber side down as described below.

FIG. 15 shows the pad rotating in the direction of arrow 267 from the flange side down toward the rubber side down. The cam 265 is in contact with the spring rod 260 at point q. FIG. 17 shows the stabilizer pad rotating in the direction of arrow 270 from the rubber side down to the flange side down. The cam 265 is in contact with the spring rod 260 at point p. Because point q is closer to the fixed end of the spring rod 260 than point p there is a greater force exerted by the spring rod on the cam at point q than at point p. Therefore, there is a greater force against rotation from the flange side to the rubber side than from the rubber side to the flange side An additional feature of the present invention will now be described in reference to FIGS. 18 and 19. As previously described, and as shown in FIG. 19, stabilizer pads, according to the prior art, exhibit an undesirable feature as they are emplaced with the rubber side down. As shown in FIG. 19, the pad may engage the ground surface with the face of the pad at an angle to the ground surface rather than horizontal to the ground as desired. When this occurs, it results in uneven wear of the rubber pad and causes the operator of the vehicle to be jolted as the pad engages the ground surface.

Figure 18:
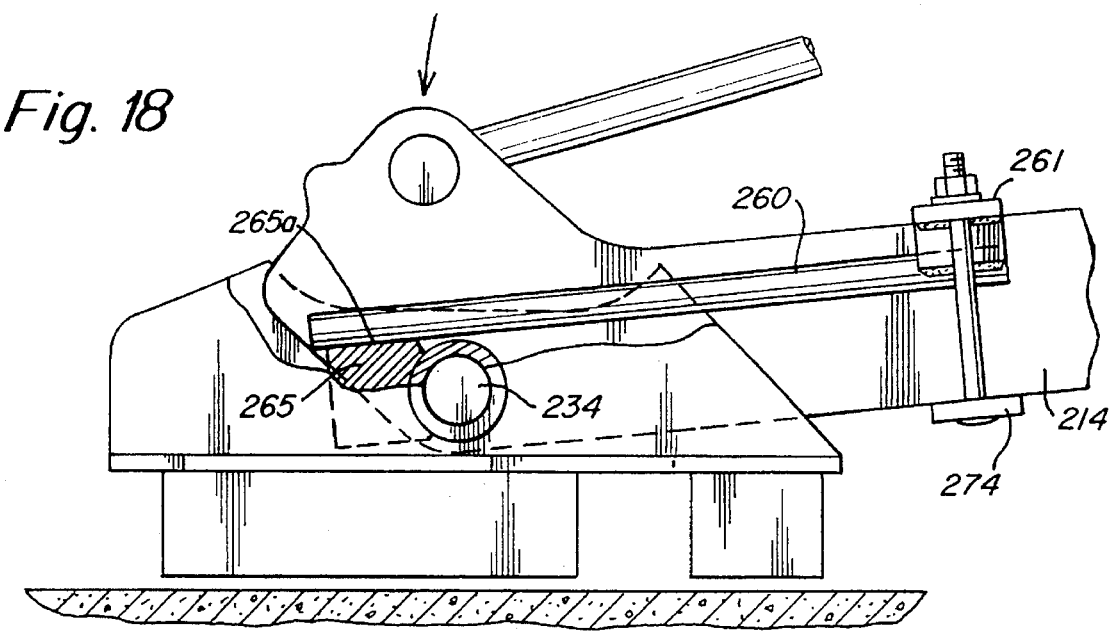
FIG. 18 is a side schematic view of the embodiment of FIG. 13 showing the pad as it engages a finished surface.
Figure 19:
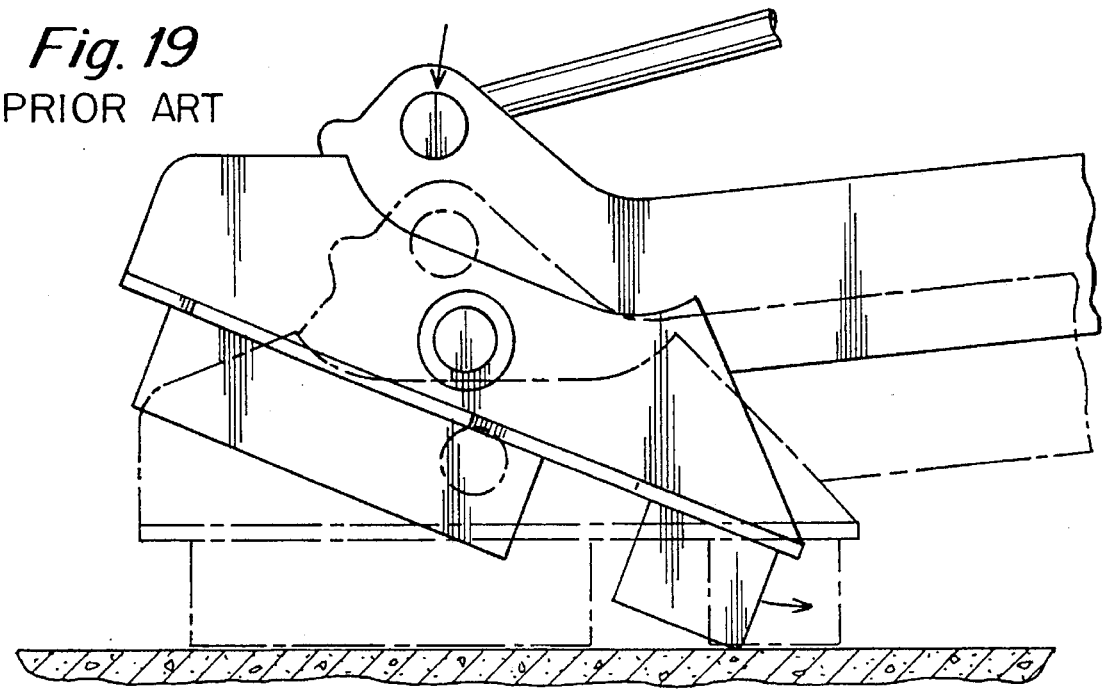
FIG. 19 is a side schematic view of a flip pad according to the prior art showing the pad engaging a finished surface with the surface of the rubber pad at an angle to the ground surface.

In the present invention, as shown in FIG. 18, the cam and the spring rod are constructed and arranged such that a flat portion 265*a* of the cam 265 is in contact with the spring rod 260 when the pad is in a predetermined rotational position with respect to the stabilizer arm. If the pad begins to rotate from this predetermined position, as shown in FIG. 17, the spring rod will begin to exert a force on the cam at position p to resist this rotation. Because of the force exerted by the spring rod, the pad will tend to stay in the position of FIG. 18. The spring rod and the cam are designed such that this predetermined position is the position that results in the face of the rubber pad being parellel to the ground surface as the pad engages the ground surface. In the manner described above, the present invention provides an indexing or self biasing feature for the stabilixer pad that solves the problem of the prior art.

It should be noted that while this indexing feature was described with respect to the rubber side of the stabilizer pad, it is equally applicable when the flange side is down as shown in FIG. 13. However, this feature is less critical with the flange side down since this side of the pad is designed to engage an uneven ground surface.

Having thus described particular embodiments of the invention, various alterations, modifications and improvements will readily occur to those skilled in the art. Such alterations, modifications and improvement as are made obvious by this disclosure are intended to be apart of this description though not expressly stated herein, and are intended to be within the spirit and scope of the invention. Accordingly, the foregoing description is by way of example only, and not limiting. The invention is limited only as defined in the following claims and equivalents thereto.

What is claimed is:

1. A stabilizer comprising:

an arm extending from a vehicle to be stabilized;

a stabilizer pad having a plate having a first ground contact face and a second ground contact face, pivotally coupled to said arm such that the plate can rotate about said arm over a predetermined range of rotation to engage a ground surface with either the first ground contact face or the second ground contact face; and spring means for providing a spring tension which resists rotation of the stabilizer pad relative to said arm, coupled to said arm and positioned so as to engage said stabilizer pad over at least a portion of the predetermined range of rotation of said stabilizer pad with respect to said arm, the spring means providing a first resistance to rotation of the stabilizer pad with respect to the arm in a first direction, and providing a second resistance to rotation of said stabilizer pad with respect to said arm in a second direction, the first resistance being greater than the second resistance.

2. The stabilizer as set forth in claim 1, wherein said spring means includes a spring rod having a first end coupled to said arm and a second end positioned so as to engage said stabilizer pad.

3. The stabilizer as set forth in claim 2, wherein said stabilizer pad includes a cam positioned such that the second end of the spring rod engages the cam over at least a portion of the predetermined range of rotation of said stabilizer pad with respect to said arm.

4. The stabilizer as set forth in claim 3, wherein said spring means includes index means for indexing the stabilizer pad to a predetermined rotational position with respect to the arm.

5. The stabilizer as set forth in claim 1, wherein said spring means includes a spring rod having a first end coupled to said arm and a second end positioned so as to engage said stabilizer pad.

6. The stabilizer as set forth in claim 5, wherein said stabilizer pad includes a cam positioned such that the second end of the spring rod engages the cam over at least a portion of the predetermined range of rotation of said stabilizer pad with respect to said arm.

7. The stabilizer as set forth in claim 6, wherein said spring means includes index means for indexing the stabilizer pad to a predetermined rotational position with respect to the arm.

8. The stabilizer as set forth in claim 1, wherein said spring means includes index means for indexing the stabilizer pad to a predetermined rotational position with respect to the arm.

9. A stabilizer comprising:

an arm extending from a vehicle to be stabilized;

a stabilizer pad having a plate having a first ground contact face and a second ground contact face, pivotally coupled to said arm such that the plate can rotate about said arm over a predetermined range of rotation to engage a ground surface with either the first ground contact face or the second ground contact face; and a spring rod, coupled to said arm, and constructed and arranged so as to engage said stabilizer pad over at least a portion of the predetermined range of rotation of said stabilizer pad with respect to said arm, and to provide a spring tension which resists the rotation of the pad relative to said arm.

10. The stabilizer as set forth in claim 9, wherein said spring rod is constructed and arranged to provide a first resistance to rotation of the stabilizer pad with respect to the arm in a first direction, and a second resistance to rotation of said stabilizer pad with respect to said arm in a second direction, the first resistance being greater than the second resistance.

11. The stabilizer as set forth in claim 10, wherein said stabilizer pad includes a cam positioned such that the second end of the spring rod engages the cam over at least a portion of the predetermined range of rotation of said stabilizer pad with respect to said arm.

12. The stabilizer as set forth in claim 11, wherein said spring rod provides a spring tension to index the stabilizer pad to a predetermined rotational position with respect to the arm.

13. The stabilizer as set forth in claim 9, wherein said stabilizer pad includes a cam positioned such that the second end of the spring rod engages the cam over at least a portion of the predetermined range of rotation of said stabilizer pad with respect to said arm.

14. The stabilizer as set forth in claim 13, wherein said spring rod provides a spring tension to index the stabilizer pad to a predetermined rotational position with respect to the arm.

15. The stabilizer as set forth in claim 9, wherein said spring rod provides a spring tension to index the stabilizer pad to a predetermined rotational position with respect to the arm.

16. A stabilizer comprising:

an arm extending from a vehicle to be stabilized;

a stabilizer pad having a plate having a first ground contact face and a second ground contact face, pivotally coupled to said arm such that the plate can rotate about said arm over a predetermined range of rotation to engage a ground surface with either the first ground contact face or the second ground contact face; and index means for indexing the stabilizer pad to a predetermined rotational position with respect to the arm.

17. The stabilizer as set forth in claim 16, wherein said index means includes a spring rod having a first end coupled to said arm and a second end positioned so as to engage said stabilizer pad.

18. The stabilizer as set forth in claim 17, wherein said index means includes a cam positioned such that the second end of the spring rod engages the cam to index said stabilizer pad with respect to said arm.

19. The stabilizer as set forth in claim 18, wherein said index means further provides a spring means for resisting rotation of the stabilizer pad relative to said arm over at least a portion of the predetermined range of rotation of said stabilizer pad with respect to said arm.

20. The stabilizer as set forth in claim 19, wherein said index means provides a first resistance to rotation of the stabilizer pad with respect to the arm in a first direction, and provides a second resistance to rotation of said stabilizer pad with respect to said arm in a second direction, the first resistance being greater than the second resistance.

21. The stabilizer as set forth in claim 16, wherein said index means further provides a spring means for resisting rotation of the stabilizer pad relative to said arm over at least a portion of the predetermined range of rotation of said stabilizer pad with respect to said arm.

22. The stabilizer as set forth in claim 21, wherein said index means provides a first resistance to rotation of the stabilizer pad with respect to the arm in a first direction, and provides a second resistance to rotation of said stabilizer pad with respect to said arm in a second direction, the first resistance being greater than the second resistance.

23. The stabilizer as set forth in claim 16, wherein said index means provides a first resistance to rotation of the stabilizer pad with respect to the arm in a first direction, and provides a second resistance to rotation of said stabilizer pad with respect to said arm in a second direction, the first resistance being greater than the second resistance.

24. A stabilizer comprising:

an arm extending from a vehicle to be stabilized;

a stabilizer pad having a plate having a first ground contact face and a second ground contact face, pivotally coupled to said arm such that the plate can freely rotate about said arm over a predetermined range of rotation to engage a ground surface with either the first ground contact face or the second ground contact face; and rotational resistance means, coupled between the arm and the stabilizer pad, for providing resistance against free rotation of the stabilizer pad with respect to the arm to impede self-flipping of the pad from the first ground contact face to the second ground contact face, the rotational resistance means providing a first resistance against rotation of the stabilizer pad in a first rotational direction and providing a second resistance against rotation in a second rotational direction, the first resistance being greater than the second resistance.

25. The stabilizer of claim 24, wherein the rotational resistance means includes means for impeding the self-flipping of the stabilizer pad from the second ground contact face to the first ground contact face.

* * * * *